(12) United States Patent
Yilmaz et al.

(10) Patent No.: US 10,932,277 B2
(45) Date of Patent: Feb. 23, 2021

(54) LOW LATENCY TRANSMISSION CONFIGURATION

(71) Applicant: Telefonaktiebolaget LM Ericsson (publ), Stockholm (SE)

(72) Inventors: Osman Nuri Can Yilmaz, Espoo (FI); Nadia Brahmi, Hildesheim (DE); Erik Eriksson, Linköping (SE); Bengt Lindoff, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 65 days.

(21) Appl. No.: 15/517,741

(22) PCT Filed: Oct. 8, 2014

(86) PCT No.: PCT/EP2014/071546
§ 371 (c)(1),
(2) Date: Apr. 7, 2017

(87) PCT Pub. No.: WO2016/055104
PCT Pub. Date: Apr. 14, 2016

(65) Prior Publication Data
US 2017/0257875 A1    Sep. 7, 2017

(51) Int. Cl.
*H04W 72/08* (2009.01)
*H04J 11/00* (2006.01)
(Continued)

(52) U.S. Cl.
CPC ......... *H04W 72/087* (2013.01); *H04J 11/005* (2013.01); *H04L 27/2602* (2013.01);
(Continued)

(58) Field of Classification Search
CPC ............... H04J 11/005; H04W 72/087; H04W 72/0413; H04W 72/0453; H04W 72/082; H04W 72/121; H04L 27/2602
See application file for complete search history.

(56) References Cited

U.S. PATENT DOCUMENTS

2004/0198345 A1   10/2004   Farber et al.
2007/0165567 A1   7/2007   Tan et al.
(Continued)

FOREIGN PATENT DOCUMENTS

CN    102695199 A   9/2012
GB    2509070 A     6/2014
(Continued)

OTHER PUBLICATIONS

NPL1, white paper, QoS Implementation in WiMAX Networks (IEEE 802.16-2009), Apr. 2010.*
(Continued)

*Primary Examiner* — Zhensheng Zhang
(74) *Attorney, Agent, or Firm* — Murphy, Bilak & Homiller, PLLC (57) ABSTRACT

A network node operates in accordance with a first (system standard) latency requirement comprising a first latency and receives a message from a wireless device, indicating that the device is adapted to transmit data associated with a second latency requirement comprising a second latency that is lower than the first latency. The network node selects a configuration for the device from a plurality of configurations, where each configuration is associated with a respective group of wireless devices adapted to transmit data associated with the second latency requirement. Each of the configurations comprises a respective radio resource for potential transmission by the devices of the respective group, and the selection is based on a probability of interference between the potential transmissions by the devices (Continued)

of the group associated with the selected configuration. The network node transmits configuration information to the device regarding the radio resource of the selected configuration.

18 Claims, 2 Drawing Sheets

(51) Int. Cl.
    *H04W 72/12*     (2009.01)
    *H04W 72/04*     (2009.01)
    *H04L 27/26*     (2006.01)

(52) U.S. Cl.
    CPC ... *H04W 72/0413* (2013.01); *H04W 72/0453* (2013.01); *H04W 72/121* (2013.01)

(56) References Cited

U.S. PATENT DOCUMENTS

| | | |
|---|---|---|
| 2007/0291696 A1 | 12/2007 | Zhang et al. |
| 2010/0329283 A1 | 12/2010 | Luo et al. |
| 2011/0158206 A1 | 6/2011 | Shrestha et al. |
| 2011/0199898 A1 | 8/2011 | Cho et al. |
| 2012/0099543 A1 | 4/2012 | Yang et al. |
| 2013/0034079 A1 | 2/2013 | Takano |
| 2013/0044657 A1 | 2/2013 | Oh et al. |
| 2013/0272119 A1 | 10/2013 | Jang et al. |
| 2014/0098761 A1 | 4/2014 | Lee et al. |
| 2014/0241272 A1 | 8/2014 | Griot et al. |
| 2017/0171875 A1 | 6/2017 | Zakrzewski |

FOREIGN PATENT DOCUMENTS

| | | |
|---|---|---|
| WO | 2012031389 A1 | 3/2012 |
| WO | 2013044497 A1 | 4/2013 |
| WO | 2013145519 A1 | 10/2013 |
| WO | 2014053152 A1 | 4/2014 |

OTHER PUBLICATIONS

NPL2, Quality of Service Support in IEEE 802.16 Networks, IEEE Network • Mar./Apr. 2006.*
NPL3, white paper, WiMAX QoS classes. 2010.*
NPL4, Cisco, Implementing Quality of Service Over Cisco MPLS VPNs, 2006.*
3GPP: LTE; General Packet Radio Service (GPRS) enhancements for Evolved Universal Terrestrial Radio Access Network (E-UTRAN) access, 3GPP TS 23.401 V10.6.0 (Dec. 2011). (Year: 2011).*
Chang, Chung-Ju et al., "GGRA: A Feasible Resource Allocation Scheme by Optimization Technique for IEEE 802.16 Uplink Systems", IEEE Transactions on Vehicular Technology, vol. 59, Issue 3, Jan. 12, 2010, 1-6.
Kwon, Taesoo et al., "Multi-Group Random Access Resource Allocation for M2M Devices in Multicell Systems", IEEE Communications Letters, vol. 16, No. 6, Jun. 2012, 834-837.
Lien, Shao-Yu et al., "Toward Ubiquitous Massive Accesses in 3GPP Machine-to-Machine Communications", IEEE Communications Magazine, vol. 49, Issue 4, Apr. 2011, 66-74.

* cited by examiner

LOW LATENCY TRANSMISSION CONFIGURATION

TECHNICAL FIELD

The present invention relates generally to the field of configuration of radio resources for wireless transmission. More particularly, it relates to configuration of radio resources for low latency transmission.

BACKGROUND

In emerging wireless communication concepts (e.g. the $5^{th}$ generation cellular communication standard advocated by the Third Generation Partnership Project—3GPP), one application considers support of reliable ultra-low delay machine-type communication (MTC), a.k.a. Critical-MTC. The Critical-MTC concept may need to address design trade-offs regarding e.g., end-to-end latency, transmission reliability, system capacity and deployment.

According to some scenarios, the Critical-MTC system should provide for radio resource management that allows coexistence between different classes of applications, for example, applications with sporadic data requiring ultra-low latency (e.g., alert messages, alarms) along with applications with real-time periodic data requiring normal latency and/or applications with data under best-effort requirements.

Existing protocols suitable for managing sharing of the same spectrum by multiple devices can be grouped in three classes:

Scheduling-based protocols: Each transmitter accesses the network using a dedicated channel (radio resource) which is scheduled, for example, every transmission time interval (TTI) or with an interval of several TTIs. UMTS LTE (Universal Mobile Telecommunication Standard—Long Term Evolution) dynamic and semi-persistent scheduling are well-known examples. Typical protocol characteristics are high reliability, long access delay, and efficient resource utilization.

Reservation-based protocols: Each transmitter accesses the network using a dedicated channel (radio resource) which is given to the device for a rather long time interval or persistently. Non-contention based random access is a well-known example. Typical protocol characteristics are high reliability, short access delay, and inefficient resource utilization.

Contention-based protocols: Two or more transmitters may attempt to simultaneously access the same channel (radio resource). Contention based radio access (UMTS, LTE) and listen-before-talk (IEEE 802.11) are well-known examples. Typical protocol characteristics are low reliability, variable access delay, and inefficient resource utilization (when a large number of transmitters simultaneously attempt to access the network).

Even though existing solutions are widely used in wireless communication networks, they may not be fully suitable for all Critical-MTC applications. For example, a scenario with sporadic small data transmissions (such as alert and emergency messages) with high reliability requirements and/or low latency requirements (e.g. short access delay) may be cumbersome or even impossible to accommodate using existing techniques. Furthermore, if efficient resource utilization and/or accommodation of a large number of devices is also required, the problem gets even more severe.

Therefore there is a need for improved radio resource management for sharing of the same radio resources by multiple wireless communication devices. Preferably, sharing should be accomplished with efficient resource utilization, while high reliability and low latency requirements of the wireless communication devices are fulfilled.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate at least some of the above disadvantages and to provide improved radio resource management for sharing of the same radio resources by multiple wireless communication devices.

According to a first aspect, this is achieved by a method of a network node of a wireless communication system, wherein the wireless communication system is adapted to operate in accordance with a first, system standard, latency requirement comprising a first latency.

The method comprises receiving a message from a wireless communication device, the message indicating that the wireless communication device is adapted to transmit data associated with a second latency requirement comprising a second latency which is lower than the first latency.

The method also comprises selecting a first configuration for the wireless communication device from a plurality of configurations. Each configuration is associated with a respective group of wireless communication devices adapted to transmit data associated with the second latency requirement. Each of the plurality of configurations comprises a respective radio resource for potential transmission by the wireless communication devices of the respective group, and the selection is based on a probability of interference between the potential transmissions by the wireless communication devices of the group associated with the selected configuration.

The method also comprises transmitting configuration information to the wireless communication device regarding the radio resource of the selected configuration.

The message may, for example, be received as part of a procedure to register the wireless communication device at the network node.

Each group of wireless communication devices may comprise any number of wireless communication devices, e.g. one or more (or even no) wireless communication devices.

In some embodiments, the number of wireless communication devices of each (or some) group may be limited to a maximum number.

In some embodiments, the number of wireless communication devices of each group is limited to one, i.e. a wireless communication device adapted to transmit data associated with the second latency requirement does not share radio resource with another wireless communication device adapted to transmit data associated with the second latency requirement.

The probability of interference between the potential transmissions by the wireless communication devices of the group associated with the selected configuration may, for example, be based on one or more of:

a probability that potential transmissions of the wireless communication device being configured causes interference to potential transmissions of one or more of the other wireless communication devices of the group; and a probability that potential transmissions of one or more of the other wireless communication devices of the group causes interference to potential transmissions of the wireless communication device being configured.

The probability of interference between the potential transmissions by the wireless communication devices of the group associated with the selected configuration may, for example, be based on one (or any suitable combination) of:
- a probability that potential transmissions occur simultaneously;
- a probability that potential transmissions overlap in time;
- a probability that a potential transmission of one wireless communication device is received by the network node with a signal level, signal-to-interference ratio, or similar measure in a specific range (e.g. exceeding a corresponding threshold).

In some embodiments, basing the selection on the probability of interference between the potential transmissions by the wireless communication devices of the group associated with the selected configuration comprises finding a minimum probability (or at least a probability that is lower than a threshold).

The probability of interference between the potential transmissions by the wireless communication devices of the group associated with the selected configuration may, according to some embodiments, be based on one or more of:
- characteristics of a radio channel between the wireless communication device and the network node;
- a traffic pattern of the wireless communication device;
- an expected transmission frequency of the wireless communication device;
- a probability of the wireless communication device of generation of data associated with the second latency requirement;
- a type of data generated by the wireless communication device;
- a location of the wireless communication device;
- a requirement regarding a probability of missed reception of transmission by the wireless communication device;
- characteristics of radio channels between other wireless communication devices of the group associated with the selected configuration and the network node;
- traffic patterns of the other wireless communication devices;
- expected transmission frequencies of the other wireless communication devices;
- probabilities of the other wireless communication devices of generation of data associated with the second latency requirement;
- types of data generated by the other wireless communication devices;
- locations of the other wireless communication devices; and
- requirements regarding probability of missed reception of transmission by the other wireless communication devices.

The characteristics of the radio channel may, for example, comprise one or more of:
- a distance between the wireless communication device and the network node;
- a received signal power at the network node;
- a received signal-to-interference ratio at the network node;
- a received signal-to-interference-and-noise ratio at the network node;
- a received signal-to-noise ratio at the network node; and
- a channel response of the radio channel.

The expected transmission frequency of the wireless communication device may, for example, relate to how often (on the average) the wireless communication device transmits a message. In some embodiments, the expected transmission frequency of the wireless communication device may be expressed as a reciprocal of an expected time interval between transmission of the wireless communication device.

According to some embodiments, the respective radio resource may comprise one of a frequency resource dedicated specifically to the respective group, a time-frequency resource dedicated specifically to the respective group, and a spreading code dedicated specifically to the respective group.

In some embodiments, the respective radio resource may comprise a frequency, time, or time-frequency resource shared with other communication of the wireless communication system, wherein the other communication does not comprise transmission of data associated with the second latency requirement.

The method may, according to some embodiments, further comprise performing uplink measurements for the wireless communication device, and determining the probability of interference between the potential transmissions by the wireless communication devices of the group associated with the selected configuration based on the uplink measurements.

In some embodiments, the method may further comprise monitoring the radio resource of the selected configuration for transmissions from the wireless communication device.

The method may, according to some embodiments, further comprise detecting a change in the probability of interference between the potential transmissions by the wireless communication devices of the group associated with the selected configuration, re-selecting a second configuration for the wireless communication device from the plurality of configurations, wherein the re-selection is based on the changed probability of interference between the potential transmissions by the wireless communication devices of the group associated with the re-selected configuration, and transmitting re-configuration information to the wireless communication device regarding the radio resource of the re-selected configuration.

The second configuration may be the same or different from the first configuration.

The change in the probability may, for example, be an increase or a decrease of the probability.

The change in the probability may, for example, be due to one or more of:
- that one or more of the wireless communication devices of the group has changed geographical location;
- that the physical environment has changed (e.g. obstacles having appeared or been removed);
- that the radio conditions have changed;
- that one or more new wireless communication devices have been added to the group; and
- that one or more new wireless communication devices have been removed from the group (or turned off).

A second aspect is a computer program product comprising a computer readable medium, having thereon a computer program comprising program instructions. The computer program is loadable into a data-processing unit and adapted to cause execution of the method according to the first aspect when the computer program is run by the data-processing unit.

According to a third aspect, an arrangement is provided for a network node of a wireless communication system, wherein the wireless communication system is adapted to operate in accordance with a first, system standard, latency requirement comprising a first latency.

The arrangement comprises a receiver, a selector and a transmitter.

The receiver is adapted to receive a message from a wireless communication device, the message indicating that the wireless communication device is adapted to transmit data associated with second latency requirement comprising a second latency which is lower than the first latency.

The selector is adapted to select (in response to the receiver receiving the message) a first configuration for the wireless communication device from a plurality of configurations. Each configuration is associated with a respective group of wireless communication devices adapted to transmit data associated with the second latency requirement. Each of the plurality of configurations comprises a respective radio resource for potential transmission by the wireless communication devices of the respective group, and the selection is based on a probability of interference between the potential transmissions by the wireless communication devices of the group associated with the selected configuration.

The transmitter is adapted to transmit configuration information to the wireless communication device regarding the radio resource of the selected configuration.

The arrangement may, according to some embodiments, further comprise a measurement unit adapted to perform uplink measurements for the wireless communication device, and a determiner adapted to determine the probability of interference between the potential transmissions by the wireless communication devices of the group associated with the selected configuration based on the uplink measurements.

In some embodiments, the arrangement may further comprise a monitor adapted to monitor the radio resource of the selected configuration for transmissions from the wireless communication device.

The arrangement may, in some embodiments, further comprise a detector adapted to detect a change in the probability of interference between the potential transmissions by the wireless communication devices of the group associated with the selected configuration. Then, the selector may be further adapted to re-select (in response to the detector detecting the change) a second configuration for the wireless communication device from the plurality of configurations, wherein the re-selection is based on the changed probability of interference between the potential transmissions by the wireless communication devices of the group associated with the re-selected configuration, and the transmitter may be further adapted to transmit re-configuration information to the wireless communication device regarding the radio resource of the re-selected configuration.

A fourth aspect is a network node of a wireless communication system comprising the arrangement according to the third aspect.

A fifth aspect is an arrangement comprising a processor, wherein the processor is specifically adapted to carry out (or cause execution of) method steps of the method according to the first aspect. A sixth aspect is a network node comprising the arrangement of the fifth aspect.

In some embodiments, the second, third, fourth, fifth and sixth aspects may additionally have features identical with or corresponding to any of the various features as explained above for the first aspect.

Basing the selection of the first configuration on the probability of interference may comprise calculating (or estimating) the probability and basing the selection on the calculated (or estimated) probability value. Alternatively or additionally, basing the selection of the first configuration on the probability of interference may comprise using interference measurements (e.g. existing measurements, instantaneous measurements, periodical measurements, filtered measurements, averaged measurements, etc.) as a basis for the selection. Such interference measurements are associated with the probability of interference and, hence, such a selection is also based on the probability of interference.

According to some embodiments, both the first and second latency requirement may be according to a system standard. For example, the first latency requirement may comprise a first system standard latency (associated with normal data communication according to the standard), while the second latency requirement may comprise a second system standard latency (associated with alarm-type communication according to the standard).

In other embodiments, the first latency requirement is according to a system standard and the second latency requirement is not specified by the system standard.

An advantage of some embodiments is that sharing of the same radio resources by multiple wireless communication devices is achieved.

Another advantage of some embodiments is that one or more of: efficient resource utilization, high reliability, and low latency may be achieved.

Another advantage of some embodiments is that the radio resource management is suitable for accommodating low cost, low power wireless communication devices.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where radio resource management is provided for sharing of the same radio resources (e.g. frequency spectrum and/or time slots) by multiple wireless communication devices.

In some embodiments, this may be accomplished by providing restricted non-orthogonal (i.e. sharing radio resource) access for Critical-MTC data. The approaches presented herein may be particularly suitable for devices sporadically transmitting small amounts of data (e.g., alert messages, alarms) requiring short latency. In a typical application a restricted set of resources that are originally allocated for other types of communication may be used for such transmissions.

Some embodiments provide means for resource restriction (mainly in frequency and time) for non-orthogonal access of sporadic transmission of small amounts of data (e.g. an alert message). Contention of such transmissions may be minimized according to some approaches. Furthermore, the near-far affect of such transmissions in the uplink can be minimized according to some approaches.

Figure 1:
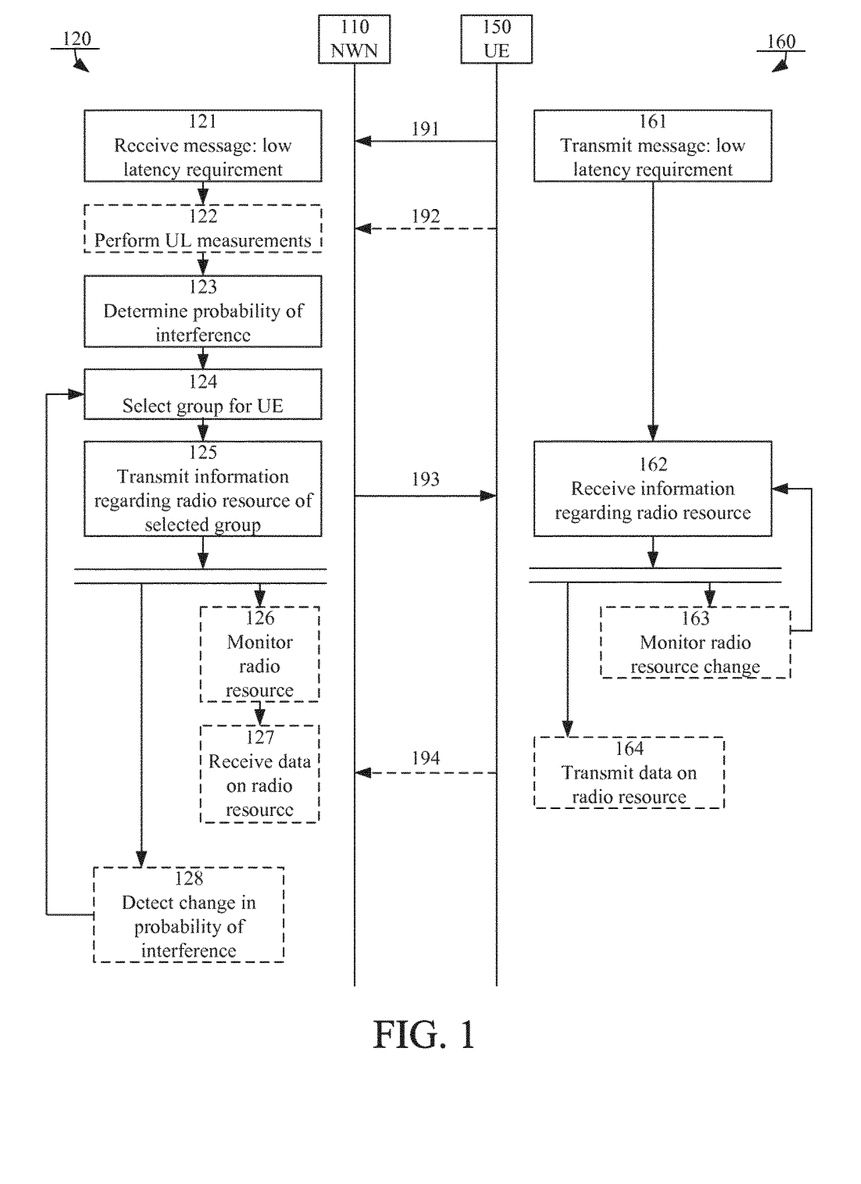
FIG. 1 is a combined flowchart and signaling diagram illustrating example method steps and signaling according to some embodiments.

FIG. 1 illustrates an example method 120 for a network node (NWN) 110, an example method 160 for a wireless communication device (UE) 150, and example signaling between the network node and the wireless communication device according to some embodiments.

Figure 2:
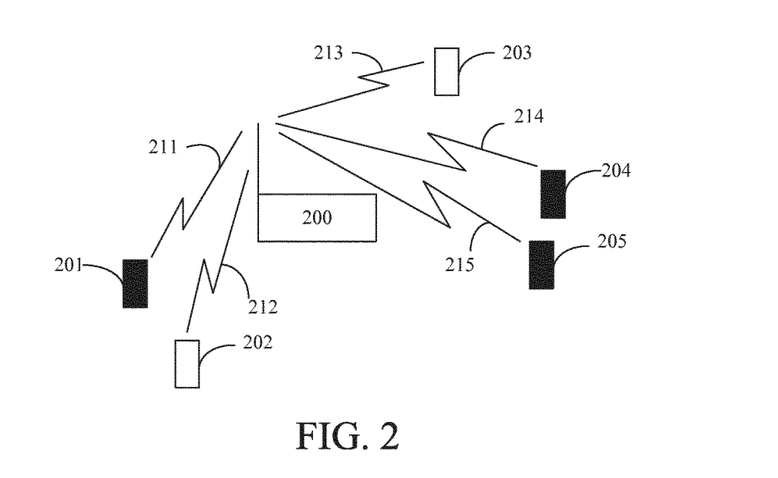
FIG. 2 is a schematic drawing illustrating an example scenario according to some embodiments.

FIG. 2 illustrates an example scenario according to some embodiments and will be described in connection with FIG. 1. A network node 200 (compare with the network node 110 of FIG. 1) is associated with a plurality of wireless communication devices 201, 202, 203, 204, 205 and communication may take place between the network node 200 and each of the wireless communication devices as illustrated by 211, 212, 213, 214, 215. Some of the wireless communication devices 201, 204, 205 (compare with the device 150 of FIG. 1) may be Critical-MTC devices as elaborated on above.

The network node 110, 200 is associated with a wireless communication system operating in accordance with a first, system standard, latency.

In step 161, the wireless communication device 150, 201 transmits a message 191 to the network node indicating that the wireless communication device is adapted to transmit data associated with a second (lower than system standard) latency requirement. Such data may, typically, be Critical-MTC data (e.g. alarms or other alert messages) as exemplified above. The message 191 is received by the network node in step 121. The transmission and reception of the message 191 may, for example, be part of a registering procedure, where the wireless communication device is associated with the network node.

In optional step 122, the network node may perform uplink 192 measurements for the wireless communication device 150, 201 (and possibly also for other wireless communication devices associated with it 204, 205, 202, 203).

The network node 110, 200 determines (in step 123) a probability of interference between the potential transmissions by the wireless communication device 150, 201 and other wireless communication devices 202, 203, 204, 205 and selects (in step 125) a group of (zero, one, two or more) other wireless communication devices 204, 205 that the wireless communication device 150, 201 should belong to. The other wireless communication devices are typically also Critical-MTC devices (i.e. adapted to transmit data associated with the second (lower than system standard) latency requirement). Each group is associated with a radio resource configuration for potential transmission by the wireless communication devices of the respective group.

The radio resource associated with each group may, for example, comprise a frequency resource dedicated specifically to the respective group, a time-frequency resource dedicated specifically to the respective group, and/or a spreading code dedicated specifically to the respective group. Alternatively or additionally, the radio resource associated with each group may comprise a frequency resource shared with other (non-Critical-MTC) communication of the wireless communication system (i.e. communication in accordance with the first, system standard, latency).

In some examples, non-orthogonal access may refer to multiple-access over the same (shared) time/frequency radio resources regardless of the use of code-spreading.

In some embodiments, wireless communication devices with a second, lower than system standard, latency requirement may be allowed to use the configured radio resource when it has a synchronization accuracy vis-à-vis the network node that is lower than a synchronization accuracy normally required for transmission.

The selection of step 124 is based on the probability determined in step 123 for each hypothesized grouping, and the probability of step 123 may be based on the uplink measurements of step 122.

For example, the probability of step 123 may be based on one or more of:

characteristics of a (uplink) radio channel between the wireless communication devices 201, 204, 205 and the network node (e.g. distance between the wireless communication device and the network node, received signal power at the network node, received signal-to-interference ratio at the network node, received signal-to-interference-and-noise ratio at the network node, received signal-to-noise ratio at the network node, channel response of the radio channel, etc.)

traffic patterns of the wireless communication devices 201, 204, 205;

expected transmission frequencies of the wireless communication devices 201, 204, 205;

probabilities of the wireless communication devices 201, 204, 205 of generation of data associated with the second (lower than system standard) latency requirement;

types of data generated by the wireless communication devices 201, 204, 205;

locations of the wireless communication devices 201, 204, 205; and a requirement regarding a probability of missed reception of transmission by the wireless communication devices 201, 204, 205.

Additionally or alternatively, the selection may be based on at least one of:

Previously allocated non-orthogonal resources to other wireless communication devices associated with the network node.

Device capability and/or behavior. For example, to avoid contention of sporadic transmissions of small amounts of data, a device capable of sending such transmissions (e.g. emergency transmissions) may be grouped with radio resources that are not granted for other wireless communication devices having the same/similar capability, thus limiting the number of wireless communication devices competing for the same radio resources and reducing the probability of collision between critical data.

Signal condition. For example, wireless communication devices that have signal conditions (e.g. signal strength and/or quality) that are in a certain interval may be configured with corresponding radio resources for non-orthogonal access. Thus, the network node may configure different radio resources (for non-orthogonal access) to different wireless communication devices based on the radio channel conditions of the respective wireless communication devices. For instance, wireless communication devices with similar received power may be grouped together and use the same radio resources, while multi-user detection and interference cancellation techniques (e.g. used in interleave-division multiple access IDMA) can be used to differentiate between them. Wireless communication devices with very bad signal conditions (e.g. low received power) may be assigned orthogonal radio resources (i.e. radio resources not allocated for other wireless communication devices), while wireless communication devices with very good signal conditions (e.g. high received power) may be assigned radio resources overlaid with radio resources also allocated for other wireless communication devices (e.g. on a part of the frequency band operating with high received quality for other messages)

Location of wireless communication devices. Possibly combined with path loss information, location information enables estimation of the received signal strength from wireless communication devices, and grouping may be done accordingly. Location may refer to a physical location of wireless communication devices and/or to spatial channel conditions enabling separation by multiple receive antennas.

The traffic pattern and/or the type of application running on the devices. Such information may indicate a probability of generating critical information and this may be used when grouping the wireless communication devices. For example, a wireless communication device with high critical message generation probability may be grouped with passive wireless communication devices (where the likelihood of generating critical data is very low). Alternatively or additionally, the event triggering the critical message and/or the reception of it may be used for the selection. For example, a seismic sensor triggering an alarm when it senses an earthquake typically has very infrequent triggers which would normally lead to grouping such sensors together, but two seismic sensors close to each other are likely to trigger alarms at the same time which leads to that it may be advisable to have them in separate groups.

In step 125, the network node 110, 200 transmits (e.g. on a broadcast channel) configuration information 193 regarding the radio resource of the selected group to the wireless communication device 150, 201, which information 193 is received by the wireless communication device 150, 201 in step 162.

After configuration, the network node may monitor the configured radio resource (in step 126) and receive data 194 there on (in step 127) if such data is transmitted by the wireless communication device (in step 164).

If there are changes in the probability of interference determined in step 123, such change may be detected by the network node in step 128 and the method returns to step 124 for a new selection (re-selection) of groups. A change in the probability may, for example, be due to one or more wireless communication devices changing location, changed radio conditions, one or more wireless communication devices being turned off (or leaving the coverage area of the network node) and one or more new wireless communication devices being associated with the network node. The wireless communication devices 150, 201 may monitor for changes in the radio resource allocation as illustrated in step 163 so that it does not miss receiving a transmission of new configuration information (step 162).

In some embodiments, the wireless communication devices may also distribute some additional information (e.g. different spreading codes or different interleavers for each device) which may be beneficial in a multi-user detection procedure during the data transmission phase. Other examples of information that may be provided by the wireless communication device and used in the selection comprise service class and bearer information.

Various scenarios will now be described using the schematic illustration of FIG. 2, where the wireless communication devices 201, 202, 203, 204, 205 are connected to the network node 200 and the wireless communication devices 201, 204, 205 are capable of transmitting data associated with a second (lower than system standard) latency requirement (e.g. Critical-MTC data, such as emergency data, alerts, alarms, etc.). In one example, the wireless communication device 201 may form a group with the wireless communication device 202 (e.g. based on uplink measurements and/or transmission behavior), which means that the wireless communication device 201 may (non-orthogonally) transmit time-critical data using any radio resources dedicated (e.g. scheduled or reserved) to 201 or 202. However, the wireless communication device 201 may not use resources dedicated to 203, 204 or 205 (since they belong to other group(s) due to radio conditions and/or device capability).

Figure 3:
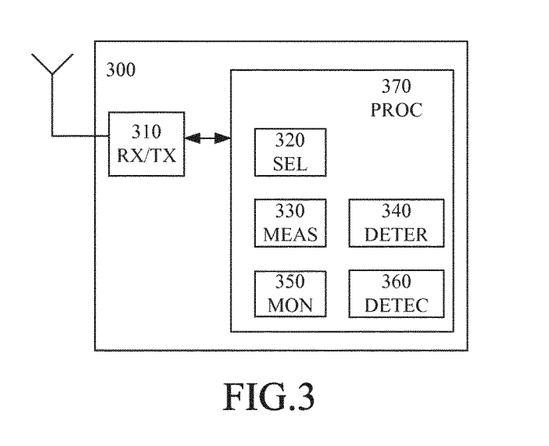
FIG. 3 is a block diagram illustrating an example arrangement according to some embodiments.

FIG. 3 illustrates an example arrangement 300 according to some embodiments. The arrangement 300 may, for example, be comprised in a network node of a wireless communication system (e.g. NWN 110 of FIG. 1) adapted to operate in accordance with a first (system standard) latency. The arrangement 300 may, for example, be adapted to perform the method 120 of FIG. 1.

The arrangement 300 comprises a transceiver (RX/TX) 310 and a processor (PROC) 370.

The receiver of the transceiver is adapted to receive a message from a wireless communication device, the message indicating that the wireless communication device is adapted to transmit data associated with a second (lower than system standard) latency requirement (compare with step 121 of FIG. 1).

The processor is adapted to select a group for the wireless communication device as elaborated on above (compare with step 124 of FIG. 1). To this end, the processor may comprise a selector (SEL) 320.

The processor may also be adapted to perform uplink measurements for one or more wireless communication devices (compare with step 122 of FIG. 1). To this end, the processor may comprise a measurement unit (MEAS) 330.

The processor may also be adapted to determine the probability of interference between potential transmissions by various wireless communication devices of hypothesized groups (compare with step 123 of FIG. 1). To this end, the processor may comprise a determiner (DETER) 340.

The determiner may be adapted to determine the probabilities based on the uplink measurements of the measurement unit and the selector may be adapted to select the group based on the probabilities of the determiner.

The selected group is associated with a radio resource configuration and the transmitter of the transceiver is adapted to transmit configuration information to the wireless communication device regarding the radio resource of the selected configuration.

The processor may also be adapted to monitor the radio resource of the selected group for transmissions from the wireless communication device (compare with step 126 of FIG. 1). To this end, the processor may comprise a monitor (MON) 350.

The processor may also be adapted to detect a change in the probability of interference (compare with step 128 of FIG. 1) and trigger a group re-selection (to the same or a different group) as a response to the detection. To this end, the processor may comprise a detector (DETEC) 360.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a network node) comprising circuitry/logic or performing methods according to any of the embodiments.

Figure 4:
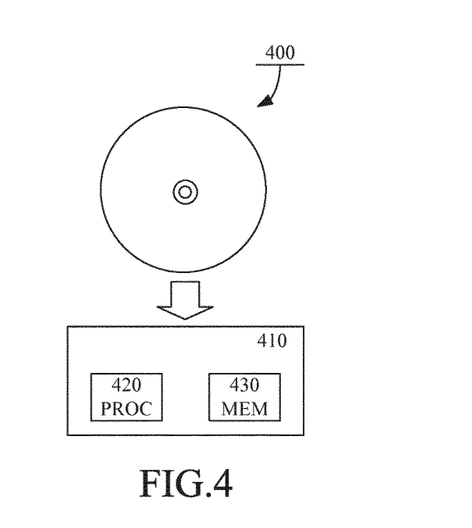
FIG. 4 is a schematic drawing illustrating a computer program product according to some embodiments.

According to some embodiments, a computer program product comprises a computer readable medium such as, for example, a diskette or a CD-ROM as illustrated by 400 in FIG. 4. The computer readable medium may have stored thereon a computer program comprising program instructions. The computer program may be loadable into a data-processing unit (PROC) 420, which may, for example, be comprised in a network node 410. When loaded into the data-processing unit, the computer program may be stored in a memory (MEM) 430 associated with or integral to the data-processing unit. According to some embodiments, the computer program may, when loaded into and run by the data-processing unit, cause the data-processing unit to execute method steps according to, for example, the method 120 shown in FIG. 1.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method, in a network node of a wireless communication system, wherein the wireless communication system is adapted to operate in accordance with a first—system standard—latency requirement comprising a first latency, the method comprising:
   receiving a message from a wireless communication device, the message indicating that the wireless communication device is adapted to transmit data associated with a second latency requirement comprising a second latency which is lower than the first latency;
   selecting a first configuration for the wireless communication device from a plurality of configurations, wherein each configuration is associated with a respective group of wireless communication devices adapted to transmit data associated with the second latency requirement, wherein each of the plurality of configurations comprises a respective radio resource for potential transmission by the wireless communication devices of the respective group, and wherein the selection is based on a probability of interference between the potential transmissions by the wireless communication devices of the group associated with the selected configuration; and
   transmitting configuration information to the wireless communication device regarding the radio resource of the selected configuration.

2. The method of claim 1, wherein the probability of interference between the potential transmissions by the wireless communication devices of the group associated with the selected configuration is based on one or more of:
   characteristics of a radio channel between the wireless communication device and the network node;
   a traffic pattern of the wireless communication device;
   an expected transmission frequency of the wireless communication device;
   a probability of the wireless communication device of generation of data associated with the second latency requirement;
   a type of data generated by the wireless communication device;
   a location of the wireless communication device; and
   a requirement regarding a probability of missed reception of transmission by the wireless communication device.

3. The method of claim 2, wherein the probability of interference between the potential transmissions by the wireless communication devices of the group associated with the selected configuration is further based on one or more of:
   characteristics of radio channels between other wireless communication devices of the group associated with the selected configuration and the network node;
   traffic patterns of the other wireless communication devices;
   expected transmission frequencies of the other wireless communication devices;
   probabilities of the other wireless communication devices of generation of data associated with the second latency requirement;
   types of data generated by the other wireless communication devices;
   locations of the other wireless communication devices; and
   requirements regarding probability of missed reception of transmission by the other wireless communication devices.

4. The method of claim 2, wherein the characteristics of the radio channel comprise one or more of:
   a distance between the wireless communication device and the network node;
   a received signal power at the network node;
   a received signal-to-interference ratio at the network node;
   a received signal-to-interference-and-noise ratio at the network node;
   a received signal-to-noise ratio at the network node; and
   a channel response of the radio channel.

5. The method of claim 1, wherein the respective radio resource comprises one of:
   a frequency resource dedicated specifically to the respective group;
   a time-frequency resource dedicated specifically to the respective group; and
   a spreading code dedicated specifically to the respective group.

6. The method of claim 1, further comprising:
performing uplink measurements for the wireless communication device; and
determining the probability of interference between the potential transmissions by the wireless communication devices of the group associated with the selected configuration based on the uplink measurements.

7. The method of claim 1, further comprising:
monitoring the radio resource of the selected configuration for transmissions from the wireless communication device.

8. The method of claim 1, further comprising:
detecting a change in the probability of interference between the potential transmissions by the wireless communication devices of the group associated with the selected configuration;
re-selecting a second configuration for the wireless communication device from the plurality of configurations, wherein the re-selection is based on the changed probability of interference between the potential transmissions by the wireless communication devices of the group associated with the re-selected configuration; and
transmitting re-configuration information to the wireless communication device regarding the radio resource of the re-selected configuration.

9. A non-transitory computer-readable medium, having thereon a computer program comprising program instructions, the computer program being loadable into a data-processing unit and adapted to cause execution of the method of claim 1 when the computer program is run by the data-processing unit.

10. An apparatus configured for a network node of a wireless communication system, wherein the wireless communication system is adapted to operate in accordance with a first—system standard—latency requirement comprising a first latency, the apparatus comprising:
a receiver configured to receive a message from a wireless communication device, the message indicating that the wireless communication device is adapted to transmit data associated with a second latency requirement comprising a second latency which is lower than the first latency;
a processing circuit configured to select, in response to the receiver receiving the message, a first configuration for the wireless communication device from a plurality of configurations, wherein each configuration is associated with a respective group of wireless communication devices adapted to transmit data associated with the second latency requirement, wherein each of the plurality of configurations comprises a respective radio resource for potential transmission by the wireless communication devices of the respective group, and wherein the selection is based on a probability of interference between the potential transmissions by the wireless communication devices of the group associated with the selected configuration; and
a transmitter configured to transmit configuration information to the wireless communication device regarding the radio resource of the selected configuration.

11. The apparatus of claim 10, wherein the probability of interference between the potential transmissions by the wireless communication devices of the group associated with the selected configuration is based on one or more of:
characteristics of a radio channel between the wireless communication device and the network node;
a traffic pattern of the wireless communication device;
an expected transmission frequency of the wireless communication device;
a probability of the wireless communication device of generation of data associated with the second latency requirement;
a type of data generated by the wireless communication device;
a location of the wireless communication device; and
a requirement regarding a probability of missed reception of transmission by the wireless communication device.

12. The apparatus of claim 11, wherein the probability of interference between the potential transmissions by the wireless communication devices of the group associated with the selected configuration is further based on one or more of:
characteristics of radio channels between other wireless communication devices of the group associated with the selected configuration and the network node;
traffic patterns of the other wireless communication devices;
expected transmission frequencies of the other wireless communication devices;
probabilities of the other wireless communication devices of generation of data associated with the second latency requirement;
types of data generated by the other wireless communication devices;
locations of the other wireless communication devices; and
requirements regarding probability of missed reception of transmission by the other wireless communication devices.

13. The apparatus of claim 11, wherein the characteristics of the radio channel comprise one or more of:
a distance between the wireless communication device and the network node;
a received signal power at the network node;
a received signal-to-interference ratio at the network node;
a received signal-to-interference-and-noise ratio at the network node;
a received signal-to-noise ratio at the network node; and
a channel response of the radio channel.

14. The apparatus of claim 10, wherein the respective radio resource comprises one of:
a frequency resource dedicated specifically to the respective group;
a time-frequency resource dedicated specifically to the respective group; and
a spreading code dedicated specifically to the respective group.

15. The apparatus of claim 10, wherein the processing circuit is further configured to:
perform uplink measurements for the wireless communication device; and
determine the probability of interference between the potential transmissions by the wireless communication devices of the group associated with the selected configuration based on the uplink measurements.

16. The apparatus of claim 10, wherein the processing circuit is further configured to monitor the radio resource of the selected configuration for transmissions from the wireless communication device.

17. The apparatus of claim 10,
wherein the processing circuit is further configured to:
detect a change in the probability of interference between the potential transmissions by the wireless communication devices of the group associated with the selected configuration; and re-select, in response to detecting the change, a second configuration for the wireless communication device from the plurality of configurations, wherein the re-selection is based on the changed probability of interference between the potential transmissions by the wireless communication devices of the group associated with the re-selected configuration; and wherein the transmitter is further configured to:

transmit re-configuration information to the wireless communication device regarding the radio resource of the re-selected configuration.

18. A network node of a wireless communication system, the network node comprising the apparatus of claim 10.

* * * * *